(12) United States Patent
Oh et al.

(10) Patent No.: US 11,904,701 B2
(45) Date of Patent: *Feb. 20, 2024

(54) APPARATUS AND METHOD OF PRODUCING VIRTUAL AFTER-BURN EFFECT IN ELECTRIC VEHICLE

(71) Applicants: Hyundai Motor Company, Seoul (KR); Kia Motors Corporation, Seoul (KR)

(72) Inventors: Ji Won Oh, Hwaseong-Si (KR); Dong Chul Park, Anyang-Si (KR); Tae Kun Yun, Anyang-Si (KR); Jeong Soo Eo, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 622 days.

This patent is subject to a terminal disclaimer.

(21) Appl. No.: 17/127,613

(22) Filed: Dec. 18, 2020

(65) Prior Publication Data
US 2022/0084497 A1 Mar. 17, 2022

(30) Foreign Application Priority Data
Sep. 17, 2020 (KR) .......... 10-2020-0119561

(51) Int. Cl.
*B60L 15/20* (2006.01)
*B60Q 1/00* (2006.01)
(Continued)

(52) U.S. Cl.
CPC .......... *B60L 15/20* (2013.01); *B60Q 1/0017* (2013.01); *B60Q 1/543* (2022.05); *G10K 15/02* (2013.01);
(Continued)

(58) Field of Classification Search
CPC .................................. B60Y 2306/11
See application file for complete search history.

(56) References Cited

U.S. PATENT DOCUMENTS 10,807,600 B2 * 10/2020 Jordan, III ............ B60W 50/14
2019/0118815 A1 4/2019 Jordan, III et al.

FOREIGN PATENT DOCUMENTS

FR 3083338 A1 1/2020

OTHER PUBLICATIONS

Archie Hamilton Racing: "This Modified Tesla Sounds Like A Lamborghini!", Mar. 7, 2020 (Mar 7, 2020), page I, XP054981679, retrieved from the Internet: URL:https://www.youtube.com/watch?v=HmDXE3o8dMc, [retrieved on Apr. 16, 2021], the whole document.

(Continued)

*Primary Examiner* — Todd Melton
(74) *Attorney, Agent, or Firm* — MORGAN, LEWIS & BOCKIUS LLP

(57) ABSTRACT

Apparatus and method of producing a virtual after-burn effect using a controller in an electric vehicle, may include receiving, by the controller, vehicle driving information during vehicle driving, determining, by the controller, virtual variable information in an internal combustion engine on the basis of the input vehicle driving information, determining, by the controller, a virtual after-burn effect characteristic on the basis of the virtual variable information in an internal combustion engine, outputting, by the controller, a control signal for producing the virtual after-burn effect on the basis of the virtual after-born effect characteristic information, and controlling, by the controller, an operation of an effect-production apparatus configured for producing the virtual after-burn effect on the basis of the control signal.

17 Claims, 7 Drawing Sheets

(51) Int. Cl.
*G10K 15/02* (2006.01)
*B60Q 1/50* (2006.01)
*H04R 1/02* (2006.01)

(52) U.S. Cl.
CPC .......... *B60L 2270/42* (2013.01); *H04R 1/025* (2013.01); *H04R 2499/13* (2013.01)

(56) References Cited

OTHER PUBLICATIONS

Extended European Search Report, dated Apr. 26, 2021, for European Patent Application No. 20216073.5.

* cited by examiner

APPARATUS AND METHOD OF PRODUCING VIRTUAL AFTER-BURN EFFECT IN ELECTRIC VEHICLE

CROSS REFERENCE TO RELATED APPLICATION

The present application claims priority to Korean Patent Application No. 10-2020-0119561, filed on Sep. 17, 2020, the entire contents of which is incorporated herein for all purposes by this reference.

BACKGROUND OF THE INVENTION

Field of the Invention

The present invention relates to an apparatus and method of providing a virtual after-burn effect in a vehicle, and more particularly, to an apparatus and method of producing a virtual after-burn effect in an electric vehicle having no internal combustion engine according to vehicle driving conditions.

Description of Related Art

As is well known, an electric vehicle (EV) is a vehicle that operates using a motor.

The drive system of such an electric vehicle includes a motor provided as a vehicle driving source, a battery connected to the motor in a chargeable or dischargeable manner to supply power to drive the motor, an inverter connected to the battery to drive and control the motor, and a reducer reducing and transmitting the rotational force of the motor to drive wheels.

Here, the inverter is configured to convert the direct current (DC) supplied from the battery to alternating current (AC) and apply AC to the motor via a power cable during the driving of the motor, and to convert AC generated from the motor to DC and supply DC to the battery, charging the battery.

The drive system of the electric vehicle as described above generates power by driving a motor with the power of a battery, rather than generating power by combusting fuel as in a conventional internal combustion engine vehicle.

Therefore, unlike the torque of an internal combustion engine generated by aerodynamic and thermodynamic reactions, the torque of an electric vehicle is more precise, smoother, and more responsive than the torque of the internal combustion engine.

Although these characteristics act as a positive part in electric vehicles, in the case of high-performance vehicles, there are times when various effects generated by the noise, physical vibration, and thermodynamic action of the internal combustion engine are emotionally important.

One of the factors that electric vehicles cannot provide due to their characteristics is the after-burn sound commonly felt in high-performance internal combustion engine vehicles and the resulting backfire phenomenon.

The after-burn sound is a sound generated by pressure changes in the exhaust system of an internal combustion engine. In high-performance vehicles, the after-burn sound is generated, expanding in a hot exhaust pipe when rich fuel is discharged through an exhaust manifold without being ignited in an engine's cylinder for various reasons.

Such an after-burn sound makes a vehicle occupant, such as a driver, feel a dynamic driving sensibility and excitement. Accordingly, there is a demand for a technology configured for virtually providing an after-burn effect similar to that of an internal combustion engine in an electric vehicle.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an apparatus and method of producing a virtual after-burn effect in an electric vehicle having no internal combustion engine according to a driving condition of the vehicle.

In various aspects of the present invention, there is provided an apparatus and method of producing a virtual after-burn effect in an electric vehicle.

According to the apparatus and method of providing a virtual after-burn effect of an electric vehicle, the after-burn effect including the after-burn sound, backfire, and vibration in an internal combustion engine vehicle may be virtually provided even in an electric vehicle, providing the driver with dynamic sports driving sensibility and excitement that can only be felt in high-performance vehicles, which improves and differentiates the product quality of an electric vehicle.

According to the apparatus and method of providing the virtual after-burn effect in an electric vehicle, when a driver desires fun driving of an electric vehicle having only quiet driving characteristics, the virtual after-burn effect is provided so that the driver can feel thrill and driving excitement even in his or her electric vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
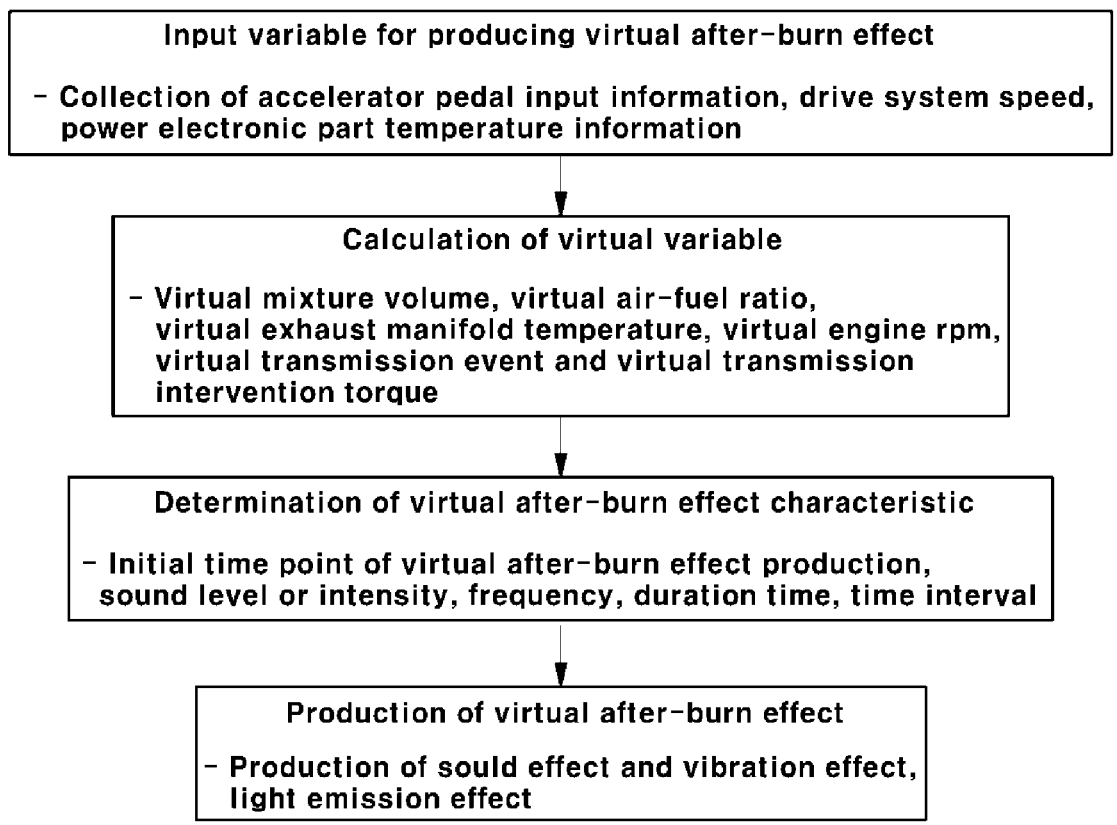
FIG. 1 is a block diagram illustrating a virtual after-burn effect provision method according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings so that those of ordinary skill in the art may easily implement the present invention. However, the present invention is not limited to the exemplary embodiments described herein and may be embodied in other forms.

When a part of the specification "includes" a certain component, it means that other components may be further included rather than excluding other components unless otherwise stated.

Various aspects of the present invention provide an apparatus and method of producing and implementing a virtual after-burn effect in an electric vehicle having no internal combustion engine according to vehicle driving conditions.

In various exemplary embodiments of the present invention, the production of the virtual after-burn effect includes an audible production that reproduces a sound effect that simulates an after-burn sound and a visual production that expresses a luminous effect that simulates a backfire. In addition to this, it may further include the production of vibration generated by the after-burn.

In the case of electric vehicles, there is no internal combustion engine (ICE) having intake and exhaust systems. However, the present invention is characterized in that a virtual variable value in an internal combustion engine is determined from an actual input variable in an electric vehicle, and an after-burn effect index, which is a characteristic of the after-burn effect, is determined using the determined virtual variable value, and a virtual after-burn effect is produced through a speaker, a motor and a vibration apparatus, a light emitting apparatus, etc. according to the determined after-burn effect index (after-burn effect characteristic).

When the after-burn effect is produced on the basis of virtual variables in an internal combustion engine according to various exemplary embodiments of the present invention, compared to simply generating an after-burn effect using actual input variables in an electric vehicle such as an accelerator pedal input value (APS value), motor speed, motor torque, etc., a more realistic virtual after-burn effect having diverse characteristics may be provided.

FIG. 1 is a block diagram illustrating a virtual after-burn effect provision method according to various exemplary embodiments of the present invention.

According to various exemplary embodiments of the present invention, actual input variable information in an electric vehicle for the production of a virtual after-burn effect during vehicle driving is collected in real time, virtual variable information in an internal combustion engine is acquired on the basis of the collected actual input variable information, and the characteristics of the virtual after-burn effect is determined in real time from the acquired virtual variable information in the internal combustion engine, and a virtual after-burn sound is output through a speaker (sound effect production), and vehicle vibration and backfire due to the after-burn are produced through a vibrator and a light emitting apparatus (the production of vibration effect and luminous effect), according to the determined virtual after-burn effect characteristic information.

According to various exemplary embodiments of the present invention, in acquiring the virtual variable value in an internal combustion engine from the actual input variable value in an electric vehicle as described above, a virtual internal combustion engine model preset in a controller may be used.

According to various exemplary embodiments of the present invention, the actual input variable information input to the controller to generate and produce the virtual after-burn effect may be vehicle driving information, which is used as input information related to the virtual internal combustion engine model to acquire virtual variable information.

The vehicle driving information may be sensor information detected by a sensor and input through an in-vehicle network, or information determined by a controller of the virtual after-burn effect production apparatus according to various exemplary embodiments of the present invention, or information input to the controller from another controller in an electric vehicle through an in-vehicle network.

The vehicle driving information as an actual input variable for the production of an after-burn effect may include at least one of an accelerator pedal input value as driver input information, a variation rate (gradient) thereof, an integral value of the accelerator pedal input value, a motor torque (motor torque command) as driving state information, a variation rate (gradient) thereof, an integral value of the motor torque, motor power, battery discharge power, drive system speed information, and temperature of power electronic components.

Such input variable information is information related to an actual system of an electric vehicle, and the above-described actual vehicle driving information may be used as an input variable for the production of an after-burn effect.

Here, the accelerator pedal input value (APS value) is based on a driver's manipulation of an accelerator pedal, and may be information detected by an accelerator pedal detection unit (APS), as described later.

The variation rate of the accelerator pedal input value refers to a gradient in variation of the accelerator pedal input value (APS value), which may be acquired by obtaining a gradient of an accelerator position sensor (APS) signal.

The motor refers to a driving motor connected to a driving wheel to drive a vehicle, and the motor torque may be a motor torque command determined by a controller on the basis of vehicle driving information collected from a vehicle. Furthermore, the variation rate of the motor torque may mean a gradient in variation of the motor torque command.

A method of determining and generating a motor torque command for controlling the torque output of a driving motor in an electric vehicle, and a process thereof, are technical matters known in the art, so a detailed description thereof will be omitted.

The drive system speed information may be one or both of speed and acceleration, wherein the speed is a rotation speed of a vehicle drive system component, which may be a motor speed, a wheel speed, or a driveshaft speed.

Furthermore, the acceleration may be obtained by differentiating a motor speed signal, a wheel speed signal, or a driveshaft speed signal, or otherwise may be an actual measured value measured by an acceleration sensor.

The temperature of the power electronic (PE) part is a temperature detected by a temperature sensor, wherein the power electronic part generally refers to a power electronic part including a drive system component.

In various exemplary embodiments of the present invention, the temperature of the power electronic part may be the motor temperature, the battery temperature, or the temperature of other power electronic components excluding the motor and the battery, for example, the inverter temperature or the temperature of other vehicle drive system components.

In electric vehicles, a water cooling system is used to circulate coolant between these parts and a radiator to cool power electronic (PE) parts such as motors, batteries, and inverters, wherein the temperature of the parts may be the coolant temperature which is detected by a temperature sensor.

In various exemplary embodiments of the present invention, a controller acquires virtual variable information in an internal combustion engine on the basis of vehicle driving information, which is actual input variable information in an electric vehicle, and determines characteristics of a virtual after-burn effect from the acquired virtual variable information in an internal combustion engine.

In various exemplary embodiments of the present invention, the virtual variable information in an internal combustion engine may be predetermined information indicating an operating state of a virtual internal combustion engine corresponding to the actual input variable information in an electric vehicle. The virtual variable information in an internal combustion engine may include at least one of virtual air-fuel mixture volume, a virtual air-fuel ratio, virtual exhaust manifold temperature, virtual engine speed (virtual engine rotation speed), and virtual transmission event information and virtual transmission intervention torque for realizing a virtual transmission effect.

Here, the virtual transmission event information may include the number of virtual transmission stages.

Furthermore, when the virtual variable information in an internal combustion engine is acquired from the actual input variable information in an electric vehicle by the controller as described above, a virtual internal combustion engine model built and stored in advance in the controller may be used as described above.

Furthermore, in various exemplary embodiments of the present invention, the characteristics of the virtual after-burn effect include a time point at which the virtual after-burn effect is initially produced through an effect-production apparatus, and at least one of the intensity of the after-burn effect, a duration time and a time interval of the after-burn effect, and a frequency band or a pitch (sound level).

Subsequently, in various exemplary embodiments of the present invention, when the characteristics of the virtual after-burn effect are determined as described above, the controller controls the operation of a virtual after-burn effect production apparatus provided in a vehicle for audible, vibrational, and visual production of the after-burn effect, that is, sound systems such as speakers, amplifiers, etc. For the output and reproduction of sound, vibration apparatus that generate and output vibrations, and light emitting apparatus that emit light.

Figure 2:
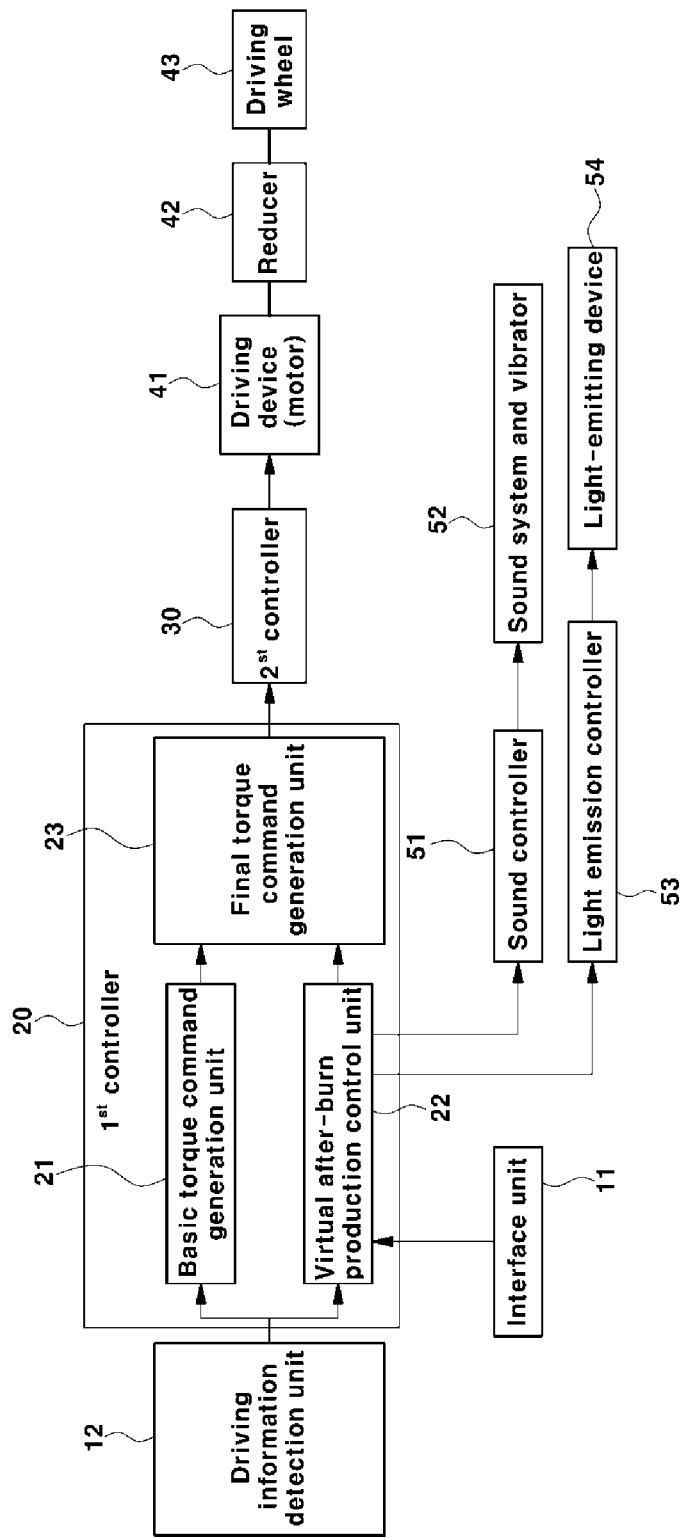
FIG. 2 is a block diagram illustrating the configuration of a virtual after-burn effect provision apparatus according to various exemplary embodiments of the present invention.
Figure 3:
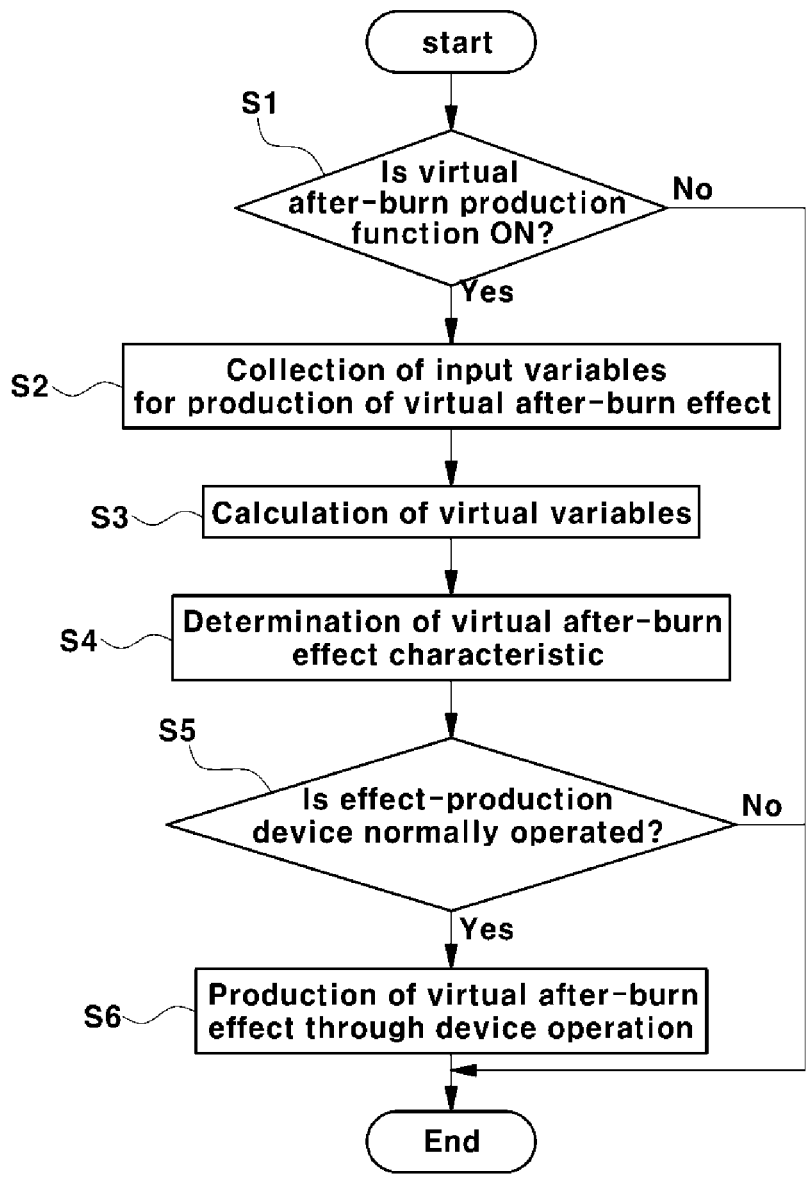
FIG. 3 is a flow chart illustrating a virtual after-burn effect provision process according to various exemplary embodiments of the present invention.

FIG. 2 is a block diagram illustrating the configuration of a virtual after-burn effect provision apparatus according to various exemplary embodiments of the present invention, and FIG. 3 is a flow chart illustrating a virtual after-burn effect provision process according to various exemplary embodiments of the present invention.

As illustrated in FIG. 2, a virtual after-burn effect production apparatus according to various exemplary embodiments of the present invention includes a driving information detection unit 12 for detecting vehicle driving information, a first controller 20 for generating and outputting a torque command on the basis of the vehicle driving information, and a second controller 30 for controlling the operation of a driving apparatus 41 according to the torque command output from the first controller 20.

Furthermore, the virtual after-burn effect production apparatus may further include an interface unit 11 provided to allow a driver to selectively input either ON or OFF signal of a virtual after-burn effect production function.

Although the control unit will be referred to as being divided into the first controller 20 and the second controller 30 in the following description, the after-burn effect production control process and the vehicle driving control process may be performed by a single integrated controller, in addition to a plurality of controllers.

The single integrated controller and the individual controllers may be collectively referred to as a controller, and the after-burn effect production control process as described below may be performed by the present controller.

For example, the first controller 20, the second controller 30, a sound controller 51, and a light-emission controller 53 in the exemplary embodiments to be described later may be collectively referred to as the controller.

The interface unit 11 may be any kind of interface unit when it is configured for a driver to manipulate ON and OFF of the virtual after-burn effect production in a vehicle. For example, the interface unit may be an operation apparatus such as a button or switch provided in a vehicle, or an input apparatus or a touch screen of an audio, video, navigation (AVN) system.

The interface unit 11 may be connected to the first controller 20, particularly, a virtual after-burn effect production control unit 22 in the first controller 20, which will be described later.

Accordingly, when a driver manipulates an ON or OFF operation through the interface unit 11, an ON or OFF signal from the interface unit 11 may be input to the virtual after-burn effect production control unit 22 of the first controller 20.

As a result, the virtual after-burn effect production control unit 22 of the first controller 20 can recognize the driver's ON or OFF operation state of the virtual after-burn effect production function (see step S1 in FIG. 3).

In various exemplary embodiments of the present invention, the function of producing the virtual after-burn effect, such as an after-burn sound and a resulting vibration thereof, and backfire visualization, during vehicle driving is executed only when the driver inputs an ON operation through the interface unit 11.

Furthermore, the interface unit 11 may be an in-vehicle input apparatus provided in a vehicle, or otherwise the interface unit may be a mobile apparatus through which a driver can input an ON/OFF operation of the virtual after-burn effect production function.

The mobile apparatus needs to be communicatively connected to an in-vehicle apparatus, for example, the first controller 20, and for the present purpose, an input/output communication interface for communication between the mobile apparatus and the first controller 20 is used.

The driving information detection unit 12 is a unit that detects vehicle driving information (driving variable information) required to perform a virtual after-burn effect production function, together with vehicle driving information (driving variable information) required to generate a motor torque command in a vehicle.

In various exemplary embodiments of the present invention, the driving information detection unit 12 includes an accelerator pedal detection unit that detects accelerator pedal input information (accelerator pedal input value) according to a driver's accelerator pedal operation, a speed detection unit that detects a speed of a vehicle drive system, and a temperature detection unit that detect temperature of power electronic components.

Here, the accelerator pedal detection unit may be a conventional accelerator position sensor (APS) which is provided on the accelerator pedal to output an electric signal according to a driver's accelerator pedal operation state.

The speed detection unit is provided to obtain speed information related to the vehicle drive system, wherein the speed information related to the vehicle drive system may include one or both of speed and acceleration of the vehicle drive system.

Here, the speed may be a speed of a motor configured for driving a vehicle, i.e., a driving motor 41, a rotation speed of a vehicle wheel, or a rotation speed of a driveshaft (driveshaft speed).

Here, the speed detection unit may be a resolver provided on the driving motor 41, a wheel speed sensor provided on a vehicle wheel, or a sensor configured for detecting the rotation speed of a driveshaft.

The acceleration may be obtained by differentiating the speed signal of the speed detection unit, or may be an actual acceleration measurement value detected by the acceleration sensor as the speed detection unit.

The temperature detection unit is for detecting the temperature of the power electronic components, and may be a temperature sensor that detects the temperature of the component, or a temperature sensor (coolant temperature sensor) that detects the temperature of coolant for cooling the component.

Here, the power electronic component includes a motor 41 that drives a vehicle, an inverter for driving and controlling the motor, a battery connected to the motor 41 to be charged and discharged through the inverter, and other power electronic components or drive system components related to motor driving.

Furthermore, in various exemplary embodiments of the present invention, the vehicle driving information may further include a vehicle speed which is used to generate a basic torque command in a basic torque command generation unit 21 to be described later.

In the instant case, the driving information detection unit 12 may further include a vehicle speed detection unit of detecting a current driving vehicle speed, although not shown in FIG. 2, wherein the vehicle speed detection unit may include a wheel speed sensor provided on a driving wheel of a vehicle.

Furthermore, the first controller 20 may include a basic torque command generation unit 21 that determines and generates a basic torque command from vehicle driving information, a virtual after-burn effect production control unit 22 that determines and generates a corrected torque command (a torque command for virtual after-burn production intervention) for generating a motor vibration for the production of a virtual after-burn effect from the vehicle driving information as input variable information, and a final torque command generation unit 23 that generates a final torque command corrected by correcting the basic torque command with the corrected torque command.

The basic torque command may be a motor torque command which is determined and generated on the basis of vehicle driving information collected while driving of a conventional electric vehicle, and the basic torque command generation unit 21 may be a vehicle control unit (VCU) or a portion thereof that generates a motor torque command on the basis of vehicle driving information related to a conventional electric vehicle.

Furthermore, the virtual after-burn production control unit 22 is a novel component that determines, generates, and outputs the intervention torque command for the production of a virtual after-burn effect, which is a corrected torque command only for realizing a virtual after-burn effect, apart from the basic torque command according to various exemplary embodiments of the present invention. The virtual vibration control unit may be added as part of the vehicle controller or may be provided as a separate control element from the vehicle controller.

In various exemplary embodiments of the present invention, the first controller 20 collects input variables for producing the virtual after-burn effect (step S2 in FIG. 3), wherein the vehicle driving information, which is actual input variable information in an electric vehicle, is input to the controller 20 and is used as an input of a virtual internal combustion engine model in the virtual after-burn production control unit 22.

In various exemplary embodiments of the present invention, the virtual after-burn production control unit 22 is a control element that performs overall control for producing a virtual after-burn effect by obtaining virtual variable information in an internal combustion engine on the basis of vehicle driving information, which is actual input variable information in an electric vehicle, and determining the characteristics of the virtual after-burn effect from the obtained virtual variable information.

Furthermore, the virtual after-burn production control unit 22 generates the corrected torque command from the determined virtual after-burn effect characteristic information, and allows the operation of the virtual after-burn effect production apparatus 52 and 54 to be controlled according to the determined virtual after-burn effect characteristic information.

In the final torque command generation unit 23, the basic torque command input from the basic torque command generation unit 21 is corrected by the corrected torque command input from the virtual after-burn production control unit 22, and the final torque command may be determined by summing the corrected intervention torque command for the production of a virtual after-burn effect and the basic torque command.

The second controller 30 receives the torque command transmitted from the first controller 20, that is, the final torque command determined by the final torque command generation unit 23 of the first controller 20 to control the operation of the driving apparatus 41.

In various exemplary embodiments of the present invention, the driving apparatus 41 is a motor, i.e., a driving motor 41, which is connected to the driving wheel 43 to drive a vehicle. At the instant time, the second controller 30 may be a known motor control unit (MCU) that drives the motor 41 through an inverter and controls the driving of the motor 41 in a conventional electric vehicle.

In various exemplary embodiments of the present invention, the intervention torque command for producing a virtual after-burn effect is for imparting a virtual after-burn effect to the torque of the motor to producing a slight tremor of the motor torque matching the virtual after-burn effect characteristic.

The intervention torque command for producing a virtual after-burn effect may have a command value that fluctuates in a wave form having a predetermined cycle and amplitude.

Alternatively, the intervention torque command for producing a virtual after-burn effect may have a command value linked to the virtual after-burn effect characteristic, and for example, may have a command value with a pulse form corresponding to the intensity and frequency, a duration time, and a time interval of a virtual after-burn effect among the virtual vibration characteristics.

In various exemplary embodiments of the present invention, the torque and rotation force output by the motor, which is the driving apparatus 41, are reduced by the reducer 42 and then transmitted to the driving wheel 43 as illustrated in FIG. 2. When the driving of the motor 41 is controlled according to the final torque command corrected by the intervention torque command for the production of a virtual after-burn effect, the motor torque is output together with a slight tremor of the motor torque configured for producing a virtual after-burn effect.

Accordingly, the virtual after-burn production control unit 22 of the first controller 20 determines a virtual variable in an internal combustion engine by use of the vehicle driving information as an actual input variable of the virtual internal combustion engine model (step S3 in FIG. 3).

That is, the virtual variable in an internal combustion engine is determined through the virtual internal combustion engine model on the basis of vehicle driving information including at least one of an accelerator pedal input value, a variation rate (a gradient of APS value) of the accelerator pedal input value, an integral value of the accelerator pedal input value, a motor torque, a variation rate (a gradient of motor torque) of the motor torque, an integral value of the motor torque, a drive system speed, and temperature of power electronic components.

The virtual variable information in an internal combustion engine may include at least one of virtual air-fuel mixture volume, a virtual air-fuel ratio, virtual exhaust manifold temperature, virtual engine speed (virtual engine rotation speed), and virtual transmission event information and virtual transmission intervention torque for realizing a virtual transmission effect.

Accordingly, characteristics of the virtual after-burn effect are determined from the virtual variables determined by the virtual internal combustion engine model (step S4 in FIG. 3).

Here, the virtual after-burn effect may include a sound effect of generating and outputting a sound that simulates an after-burn sound of an internal combustion engine vehicle through the sound system 52.

Furthermore, the virtual after-burn effect may further include a vibration effect of generating a vibration that simulates a vehicle vibration caused by after-burn in an internal combustion engine vehicle through the vibrator 52.

Furthermore, the virtual after-burn effect may further include a light-emitting effect of expressing a light-emitting state that simulates a backfire caused by after-burn in an internal combustion engine vehicle through the light emitting apparatus 54.

Here, the characteristics of the virtual after-burn effect may include a time point at which the virtual after-burn effect is initially produced through the effect-production apparatus.

Furthermore, the characteristics of the virtual after-burn effect may include at least one of the intensity of the after-burn effect, a duration time and a time interval of the after-burn effect, and a frequency band or a pitch (sound level).

Furthermore, when the virtual after-burn effect is a vibration effect that simulates vehicle vibration due to after-burn, the characteristics of the virtual after-burn effect may include at least one of the intensity and frequency, a duration time, and a time interval of the vibration, in addition to the time point at which the virtual after-burn effect is initially produced.

Furthermore, when the virtual after-burn effect is a light-emitting effect that simulates a backfire caused by after-burn, the characteristics of the virtual after-burn effect are at least one of the intensity and frequency, a duration time, and a time interval of light emission, in addition to the time point at which the virtual after-burn effect is initially produced.

The virtual after-burn production control unit 22 of the first controller 20 transmits the determined characteristic information related to the virtual after-burn effect to the sound controller 51 and the light emission controller 53, so that the sound controller 51 and the light emission controller 53 checks whether the sound system, the vibrator 52, and the light emitting apparatus 54 are in a normal state through predetermined diagnostic logic (step S5 in FIG. 3), and if they are in a normal state, outputs a control signal for controlling the operation of the apparatuses.

That is, the sound controller 51 generates and outputs an acoustic control signal for reproducing and outputting a virtual after-burn sound in a vehicle from the characteristic information related to the virtual after-burn effect received from the virtual after-burn production control unit 22.

Furthermore, the sound controller 51 (or a separate vibration controller not shown) generates and outputs a vibration control signal for generating a vibration in a vehicle that matches the virtual after-burn effect characteristics.

While the operation of the sound system 52 is controlled according to the sound control signal output from the sound controller 51, the virtual after-burn sound is reproduced and output by the sound system 52, and at the same time, while the operation of the vibrator 52 is controlled according to the vibration control signal output from the sound controller 51, the vibration for producing a virtual after-burn effect matching the virtual after-burn effect characteristics is generated by the vibrator 52 (step S6 in FIG. 3).

In various exemplary embodiments of the present invention, the sound system 52 may include a speaker and a woofer provided in at least one of a vehicle interior and a vehicle exterior, and the vibrator 52 may be a vibration actuator provided on a driver's seat or a body part around the driver's seat to apply vibration thereto.

The light emission controller 53 is for realizing the visual production of a backfire by generating and outputting a light emission control signal for realizing the visual production of the backfire from the virtual after-burn effect characteristic information received from the virtual after-burn production control unit 22.

At the present time, the light emission controller 53 outputs a light-emitting control signal for visually producing a backfire effect which is linked to the virtual after-burn effect characteristics, and a visual effect that simulates the backfire of an internal combustion engine vehicle may be produced through the light emitting apparatus 54 while the operation of the light emitting apparatus 54 is controlled according to the light-emitting control signal output from the light emission controller 53.

When the light emitting apparatus 54 is provided outside the vehicle, it may be provided at the rear end portion of the vehicle body or at both the rear end portion and front end portion of the vehicle body. The light emitting apparatus may be a lamp assembly configured for simulating the visual effect of a backfire. Furthermore, any other light emitting apparatus 54 configured for visually expressing an effect of a backfire may be applied.

Meanwhile, a method of determining a virtual variable value in an internal combustion engine by the virtual after-burn production control unit 22 of the first controller 20 will be described below in detail.

In various exemplary embodiments of the present invention, the virtual variable information in an internal combustion engine may include at least one of virtual air-fuel mixture volume, a virtual air-fuel ratio, virtual exhaust manifold temperature, virtual engine speed (virtual engine rotation speed), and virtual transmission event information and virtual transmission intervention torque for realizing a virtual transmission effect. In addition to this, information indicating an operation state of an internal combustion engine including input variable information, such as an accelerator pedal input value, a torque command, a rotation speed, etc., and information indicating the operation state of an internal combustion engine related to the after-burn effect may be additionally used.

The above-described virtual variable information will be described one by one as follows.

FIG. 4, FIG. 5, FIG. 6 and FIG. 7 are diagrams illustrating virtual variable values depending on input variables according to various exemplary embodiments of the present invention.

Virtual Air-Fuel Mixture Volume

A virtual mixture volume may be obtained using at least one or two or more of the above input variables or a product of two or more selected values as a variable, by use of information previously set and input to and stored in the controller, that is, the virtual after-burn production control unit 22 of the first controller 20, for example, setting data of such as an equation or map, or a table or diagram of a virtual internal combustion engine model.

In various exemplary embodiments of the present invention, the virtual mixture volume may be determined as a value proportional to an accelerator pedal input value (APS value) or a motor torque (motor torque command) among the above input variables.

Alternatively, the virtual mixture volume may be obtained from a motor speed, motor power, or battery discharge power among the above input variables, as a value corresponding thereto.

Alternatively, the virtual mixture volume may be obtained from a virtual engine speed, which is one of the virtual variables described later, as a value corresponding thereto.

Alternatively, the virtual mixture volume may be obtained as a value corresponding to the product of the motor torque and the motor speed or the product of the motor torque and the virtual engine speed.

In the instant case, the virtual mixture volume may be obtained by use of setting data of such as a map, a table, or a diagram, or an equation using at least one or two values of the variables, or the product of two or more variable, as a variable.

The setting data may be set using data obtained through a preceding test and evaluation process, or may be an equation, a map, a table, or a diagram pre-defining a correlation between the above-described input variable, a predetermined virtual variable, or the product of these variables and the virtual mixture volume.

The setting data is previously input and stored in the virtual after-burn production control unit 22 and is used to determine the virtual mixture volume from a predetermined variable value.

Figure 4:
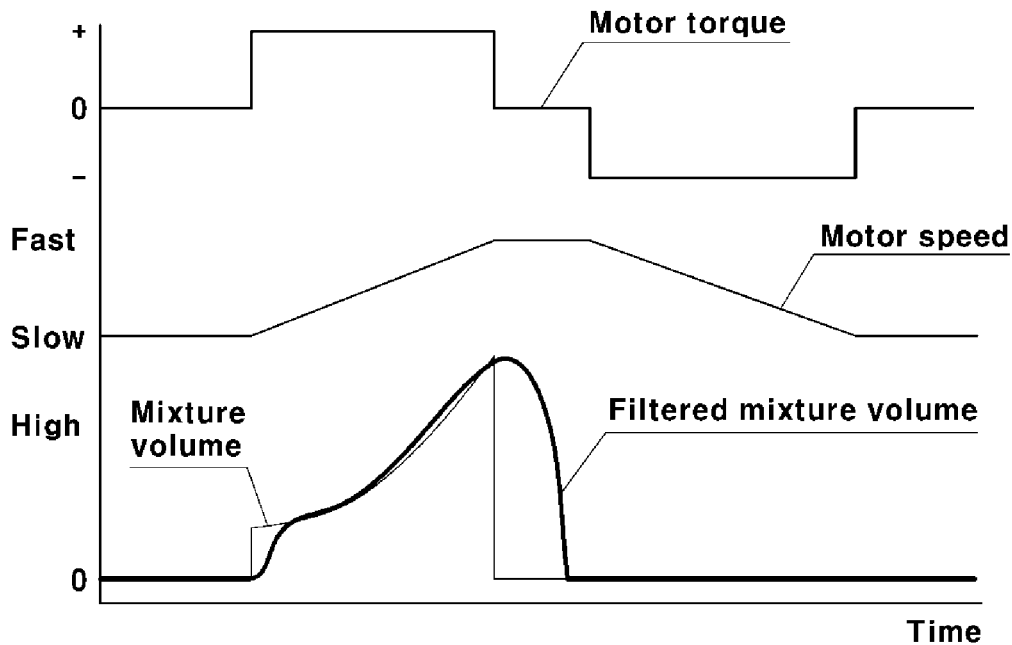
FIG. 4, FIG. 5, FIG. 6 and FIG. 7 are diagrams illustrating virtual variable values depending on input variables according to various exemplary embodiments of the present invention.

Referring to FIG. 4, the correlation between the input variable and the virtual mixture volume is illustrated, wherein the virtual mixture volume in the setting data of the virtual after-burn production control unit 22 may be set to a larger value as a value, such as an accelerator pedal input value (APS value), a motor torque, motor power, battery discharge power, or the like, increases.

Furthermore, to represent the virtual mixture volume, a value obtained by applying a delay or a rate limit, a filter lag, etc. To the mixture volume determined by the setting data may be determined and used as a final virtual mixture volume.

Referring to FIG. 4, the filtered mixture volume is illustrated.

Virtual Air-Fuel Ratio

In the controller, that is, the virtual after-burn production control unit 22 of the first controller 20, the virtual air-fuel ratio may be determined by use of setting data such as a multidimensional map or an equation using variables such as the accelerator pedal input value (APS value), the variation rate of the accelerator pedal input value (the variation rate in the APS value), the motor torque, the variation rate of the motor torque, the motor speed, the virtual engine speed or a combination thereof.

In the instant case, the virtual air-fuel ratio may be set to further decrease as the accelerator pedal input value (APS value) or the motor torque increases in the setting data of the virtual after-burn production control unit 22.

Here, the decrease in the air-fuel ratio means that the value becomes richer in density.

Alternatively, the air-fuel ratio may be set to further decrease as the variation rate of the accelerator pedal input value or the instantaneous decrease rate of the motor torque, which is the variation rate of the motor torque, increases.

Figure 5:
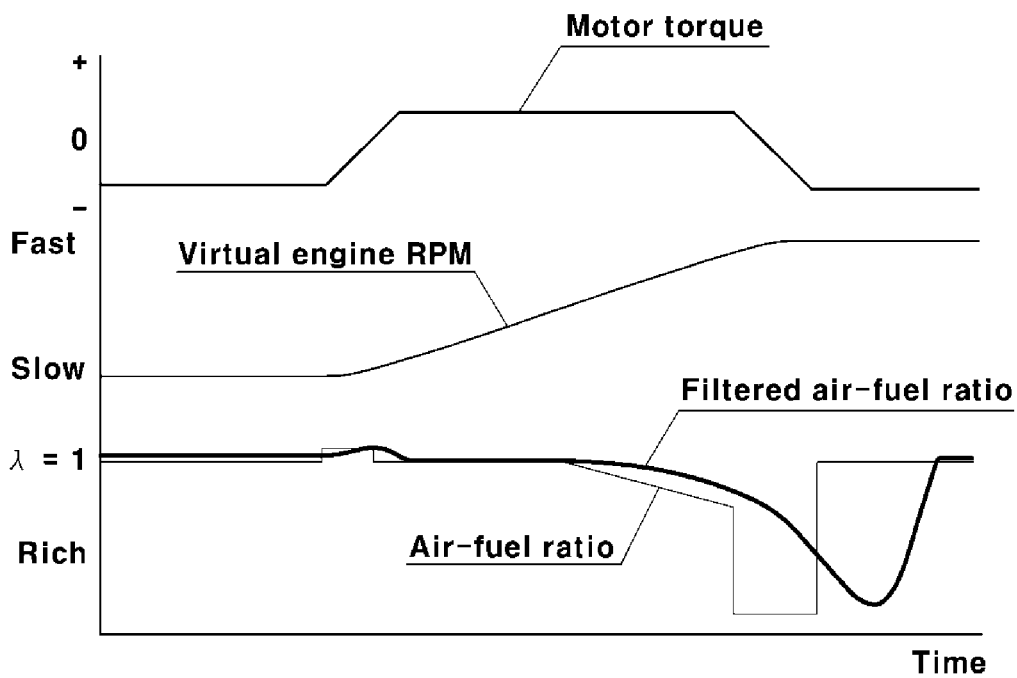

Alternatively, the air-fuel ratio may be set to decrease as the drive system speed such as a motor speed or the virtual engine speed as illustrated in FIG. 5 increases.

Furthermore, to represent the non-combustible residual air-fuel mixture, a value obtained by applying a delay, a rate limit, a filter lag, etc. To the air-fuel ratio determined by the setting data may be determined and used as a final virtual air-fuel ratio.

Referring to FIG. 5, the filtered virtual air-fuel ratio is illustrated.

Virtual Exhaust Manifold Temperature

The virtual exhaust manifold temperature may mean a virtual exhaust temperature, that is, a virtual exhaust gas temperature.

In the controller, that is, the virtual after-burn production control unit 22 of the first controller 20, the virtual exhaust manifold temperature may be determined by setting data such as a multidimensional map or equation from the accelerator pedal input value (APS value), motor torque, motor power, battery discharge power, motor speed, or virtual engine speed.

Figure 6:
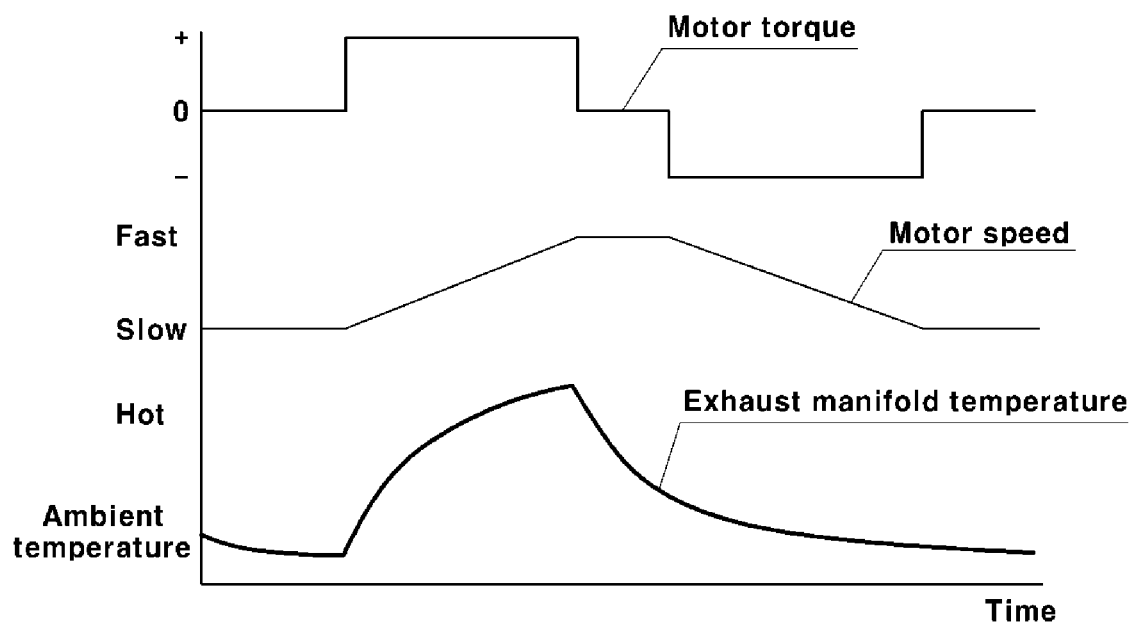

FIG. 6 is a diagram illustrating an example of setting a virtual exhaust manifold temperature according to a motor torque and a motor speed.

In the setting data, the virtual exhaust manifold temperature may be set to a higher value as the accelerator pedal input value, motor torque, motor power, battery discharge power, motor speed, or virtual engine speed increases.

Furthermore, when the virtual exhaust manifold temperature reaches a predetermined limit temperature, the virtual exhaust manifold temperature may be set to stop increasing.

Alternatively, as the virtual exhaust manifold temperature approaches a predetermined limit temperature, the virtual exhaust manifold temperature increase rate may be set to decrease.

Furthermore, a basic cooling rate of the virtual exhaust manifold temperature may be provided, wherein the virtual exhaust manifold temperature may be set according to the actual temperature measured by a driving cooling system or the actual ambient temperature.

Here, both the measured temperature of the driving cooling system and the measured ambient temperature are values measured by a temperature sensor, wherein the measured temperature of the driving cooling system may be an exhaust system temperature measured by a temperature sensor at a predetermined position in the exhaust system and the measured ambient temperature may be a temperature measured by a conventional ambient temperature sensor.

In various exemplary embodiments of the present invention, the cooling rate of the virtual exhaust manifold temperature may be set to a value corresponding to the ambient temperature and the vehicle speed (related to the driving wind), or otherwise the virtual exhaust manifold temperature may be set on the basis of a temperature model.

Virtual Engine Speed (Virtual Engine Speed)

In the controller, that is, the virtual after-burn production control unit 22 of the first controller 20, the virtual engine speed may be determined as a variable multiple of the motor speed, wherein the coefficient value multiplied by the motor speed is a value which is determined according to a virtual transmission and gear ratio model or a virtual current transmission stage.

In this regard, the inventors of the present invention have filed a patent application for a control method for generating a virtual transmission effect in an electric vehicle so that a multi-stage transmission effect may be generated and realized through motor torque control in an electric vehicle having no multi-stage transmission, wherein a virtual engine speed as one of the virtual variables required to generate and produce a multi-stage transmission effect in the control process is disclosed.

In the present way, a virtual engine speed, which is a virtual variable used to generate and produce a multi-stage transmission effect, may be used as a virtual variable for producing a virtual after-burn effect according to various exemplary embodiments of the present invention.

To describe the virtual engine speed in more detail, in various exemplary embodiments of the present invention, the virtual after-burn production control unit 22 may determine the virtual engine speed by use of the virtual vehicle speed and virtual gear ratio information related to the virtual current gear stage.

Here, the virtual vehicle speed may be determined as a value which is directly proportional to the actual motor speed by use of the actual motor speed, which is one of the input variables, and the virtual final reduction gear ratio, wherein the virtual final reduction gear ratio is preset by the virtual after-burn production control unit 22.

In various exemplary embodiments of the present invention, the virtual vehicle speed is determined using the motor speed measured during vehicle driving and the virtual final reduction gear ratio, and the virtual engine speed may be determined in real time by the virtual vehicle speed.

In the instant case, the virtual engine speed may be obtained from a value obtained by multiplying the virtual vehicle speed and the virtual gear ratio of the virtual current transmission stage, or otherwise the virtual engine speed may be obtained from a value obtained by multiplying the drive system speed, such as the motor speed, and the virtual gear ratio of the virtual current transmission stage.

Furthermore, the virtual current transmission stage may be determined from a transmission schedule map preset in the virtual after-burn production control unit 22 from the virtual vehicle speed and the accelerator pedal input value (APS value).

When the virtual current transmission stage is determined as described above, the virtual engine speed may be determined in real time using the virtual vehicle speed and the virtual gear ratio corresponding to the determined transmission stage.

In the present way, the virtual engine speed determined in real time as described above may itself be used to determine the above-mentioned virtual variables, that is, the virtual air-fuel volume, the virtual air-fuel ratio, the virtual exhaust manifold temperature, etc.

Virtual Transmission Event Information and Virtual Transmission Intervention Torque for Realizing a Virtual Transmission Effect As a gear transmission event occurs in a virtual transmission model, a virtual transmission torque intervention may be performed, wherein the virtual transmission intervention torque may be produced in a form of a motor torque command.

In this regard, the inventors of the present invention have filed a patent application for a control method for generating a virtual transmission effect in an electric vehicle so that the multi-stage transmission effect may be generated and realized through motor torque control in an electric vehicle having no multi-stage transmission.

In the control process for generating the virtual transmission effect in an electric vehicle, the controller (which may be a virtual after-burn production control unit) may determine the occurrence of the transmission event from the above-described virtual vehicle speed and accelerator pedal input value (APS value) using a preset transmission schedule map, and may determine a virtual target transmission stage.

Furthermore, when a transmission event occurs, a virtual transmission effect is generated and implemented through motor torque control, wherein a motor torque command is corrected to generate and implement the virtual transmission effect, and the corrected torque for correcting the motor torque command is the virtual transmission intervention torque.

Here, the control process for generating the virtual transmission effect in an electric vehicle will be described in more detail step by step. The controller is configured to determine the virtual target transmission stage using a preset transmission schedule map from the virtual vehicle speed and accelerator pedal input value (or vehicle load).

Furthermore, in the controller, a transmission class is determined from the virtual current transmission stage and the determined virtual target transmission stage, and a virtual transmission intervention torque profile corresponding to the determined current transmission class among the predetermined virtual transmission intervention torque profiles for each shift class is selected.

Here, the virtual transmission intervention torque profile is a torque profile in which a virtual transmission intervention torque value is preset according to the transmission progress rate, which may be determined as a percentage (%) of the counted time relative to the preset total transmission time as an example. The present transmission progress rate may increase to 100%.

The transmission class may be divided into power-on upshift, power-off upshift (lift-foot-up), power-on downshift (kick-down), power-off downshift, near-stop downshift, and the like.

To determine the virtual transmission intervention torque, the controller is configured to determine the current transmission class, and as a method of determining the current transmission class, when the virtual target transmission stage is higher than the virtual current transmission stage (i.e., virtual target transmission stage>virtual current transmission stage), an upshift is determined, whereas when the virtual target transmission stage is lower than the virtual current transmission stage (i.e., the virtual target transmission stage<virtual current transmission stage), a downshift is determined.

Furthermore, when the basic torque command (motor torque command) is greater than the predetermined reference torque value, power-on is determined, whereas when the basic torque command is smaller than the predetermined reference torque value, power-off is determined.

Next, in the controller, a virtual transmission intervention torque for generating a virtual transmission effect is determined in real time according to the selected virtual transmission intervention torque profile, and a final motor torque command is determined by correcting the motor torque command (basic torque command) using the virtual transmission intervention torque.

At the present time, torque correction may be performed by summing the virtual transmission intervention torque and the motor torque command.

When the final motor torque command is generated as described above, the controller controls the operation of the motor configured for driving a vehicle according to the generated final motor torque command so that a virtual transmission effect is generated by the motor.

The control process for generating and producing a virtual transmission effect has been described in the foregoing. In various exemplary embodiments of the present invention, the virtual transmission event information, such as the number of virtual transmission stages, and the virtual transmission intervention torque value determined as described above are used as a virtual variable to determine the characteristics of the virtual after-burn effect.

Figure 7:
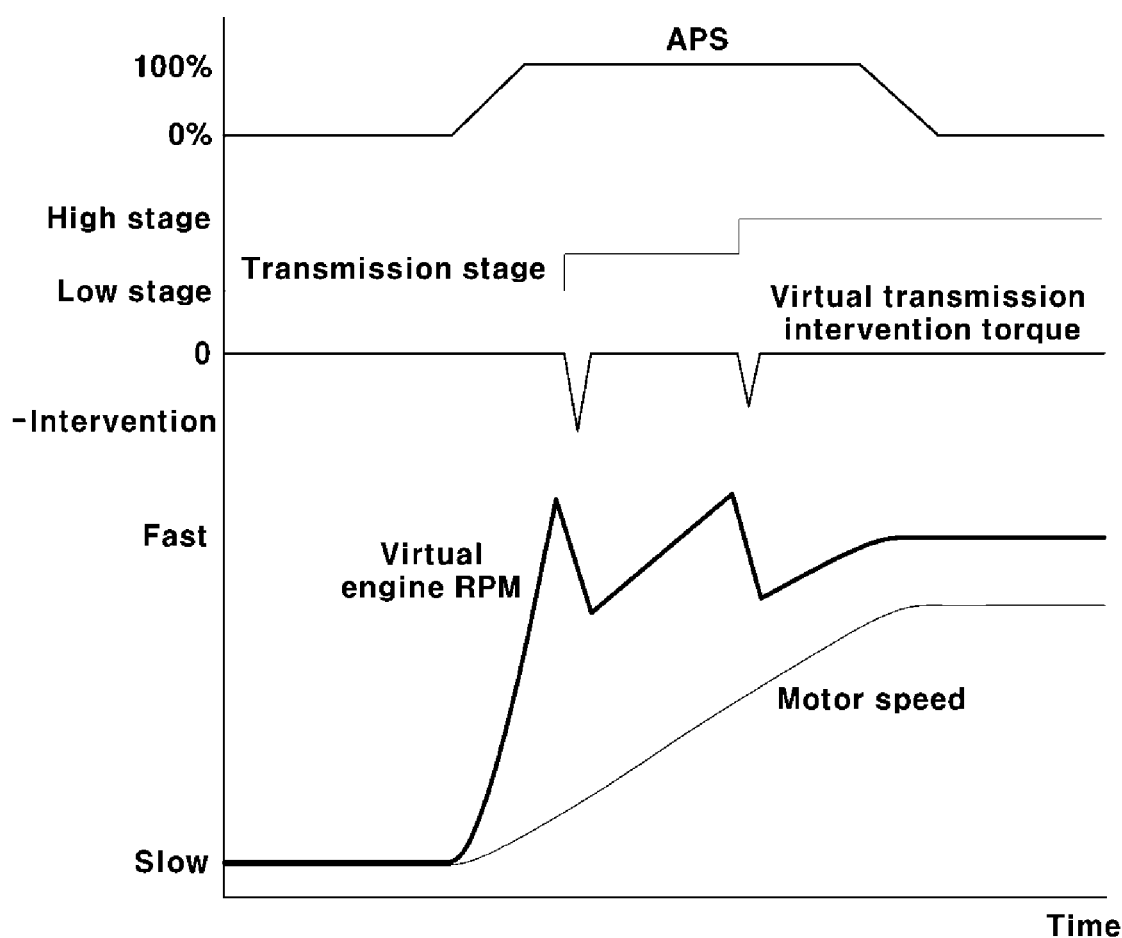

FIG. 7 illustrates an accelerator pedal input value (APS value), a virtual transmission stage, a virtual transmission intervention torque, a virtual engine speed, and a motor speed, wherein it is shown that the virtual shift intervention torque is determined every time a transmission event occurs.

When the virtual transmission intervention torque is determined for each transmission event as described above, the motor torque command is corrected using the determined virtual transmission intervention torque, and the operation of the motor is controlled according to the corrected motor torque command to generate a virtual transmission effect.

In the present way, virtual variables for determining the characteristics of the virtual after-burn effect have been described in detail according to various exemplary embodiments of the present invention. As various exemplary embodiments of the present invention, a virtual internal combustion engine model, which is a virtual physical model for an entire internal combustion engine or some systems of the internal combustion engine, may be set and build in a controller, and a driver input and a measurement variable are input to the model so that the virtual variable determined by the model may be used to determine the characteristics of the virtual after-burn effect.

For example, it is possible to set a virtual air-fuel mixture discharge volume to be proportional to the motor torque reduction rate, to set a difference between the motor power or motor torque and a preset cooling rate to be proportional to the amount of heat dissipation, and to set the virtual exhaust manifold temperature index to change as a function of the amount of heat dissipation.

In the instant case, a physical model may be set in which the product of the virtual air-fuel mixture discharge volume and the virtual exhaust manifold temperature index is proportional to the after-burn combustion effect index.

This may be expressed as equations as follows.

$$Y = a \times X_1 \times X_3 \quad (1)$$

$$X_2 = W_p - b \times X_3 \times W_c \quad (2)$$

$$dX_3/dt = c \times X_2$$

Here, Y is the after-burn effect index, a, b, and c are predetermined constants, $X_1$ is the virtual mixture discharge volume, $X_2$ is the heat dissipation amount, $X_3$ is the exhaust manifold temperature index, $W_p$ is the motor power, and $W_c$ is the cooling power.

As various exemplary embodiments of the present invention, the virtual mixture discharge volume is set to be proportional to the motor torque reduction rate, and the exhaust manifold temperature index is set to be proportional to the integral value of the motor power or motor torque, wherein a forgetting factor may be applied to an integrator as a function of the cooling rate.

In the instant case, a physical model may be set in which the product of the virtual mixture discharge volume and the exhaust manifold temperature index is proportional to the after-burn effect index.

This may be expressed as equations as follows.

$$Y = a \times X_1 \times X_3$$

$$dX_2/dt = W_p - b \times X_2$$

Here, Y is the after-burn effect index, a is a predetermined constant, b is the forgetting coefficient determined by a value between 0 and 1, $X_1$ is the virtual mixture discharge volume, $X_2$ is the exhaust manifold temperature index, and $W_p$ is the motor power.

Meanwhile, a method of determining the characteristics of the virtual after-burn effect on the basis of the virtual variable determined as described above will be referred to as follows.

Figure 8:
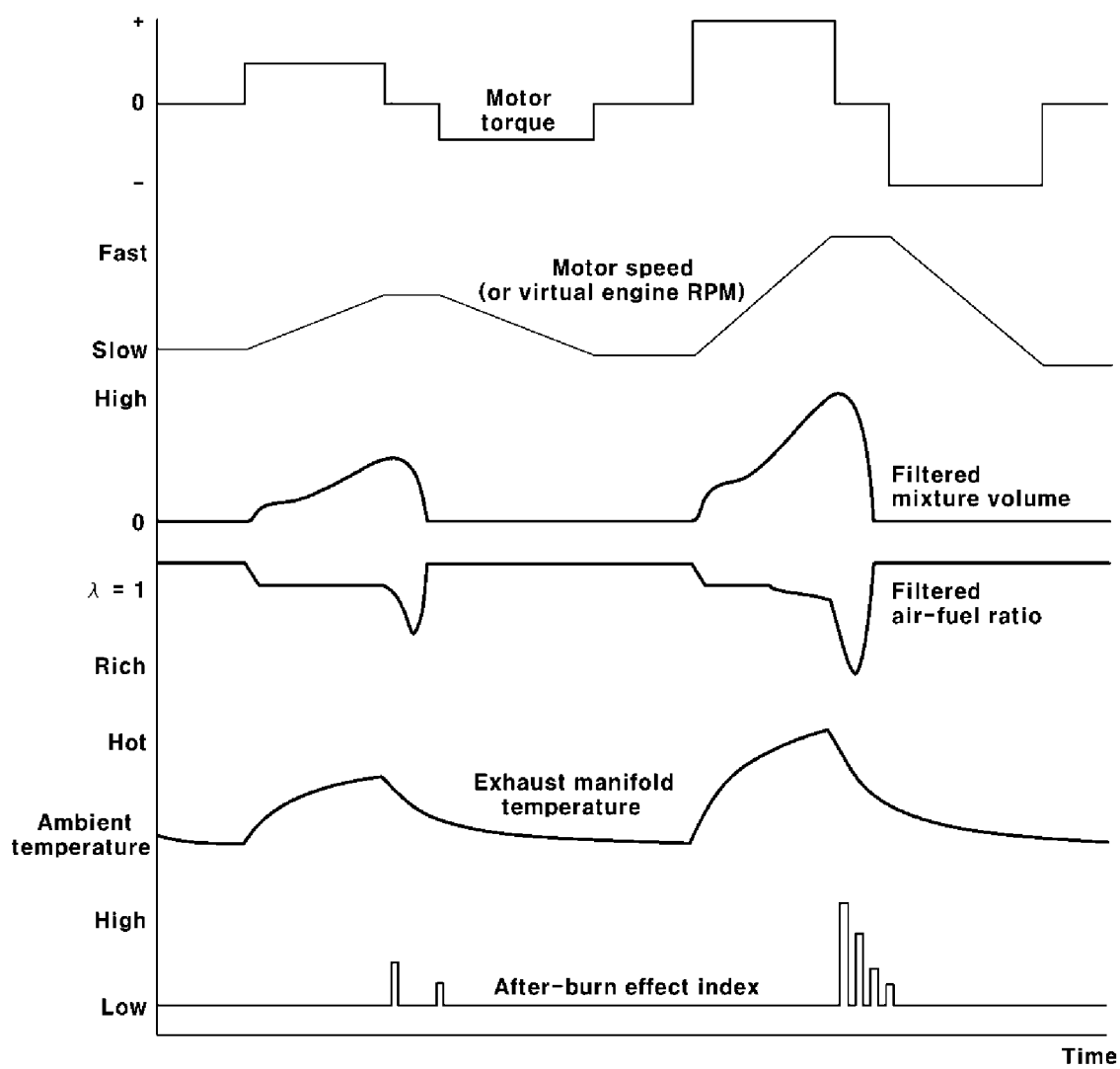
FIG. 8 is a diagram illustrating virtual after-burn effect characteristics depending on an input variable according to various exemplary embodiments of the present invention.

FIG. 8 is a diagram illustrating virtual after-burn effect characteristics depending on an input variable according to various exemplary embodiments of the present invention.

As a factor that determines the intensity of the virtual after-burn effect, the intensity may be volume if the virtual after-burn effect is in a form of sound, or illuminance if the virtual after-burn effect is in a form of light emission.

Furthermore, if the virtual after-burn effect is in a form of vibration, the intensity may be the vibration amplitude. For example, if the virtual after-burn effect is vibration in a form of pulses, the intensity may be the pulse amplitude.

To secure the reality in the virtual after-burn effect, it is necessary to adjust the intensity to suit the situation.

Furthermore, when the virtual after-burn effect is expressed in a form of sound, the frequency, which is the sound level, may be adjusted, and the virtual after-burn effect may be produced by determining a frequency band or pitch from a virtual variable.

First, in the controller, that is, the virtual after-burn production control unit 22 of the first controller 20, the volume level and the pitch of an after-burn sound may be determined as a value proportional to the virtual mixture volume, or otherwise the volume size and pitch of the after-burn sound may be determined by setting data such as a map or an equation using the virtual mixture volume as an independent variable.

Here, the volume level of the after-burn sound becomes one of the intensity of the after-burn effect, and as described above, when the after-burn effect is expressed as a sound (after-burn sound), the intensity of the after-burn effect becomes the volume level of the sound.

Alternatively, the volume size and pitch of the after-burn sound may be determined as a degree that the virtual air-fuel ratio is rich compared to $\lambda=1$ or a value proportional to the reduction rate of the virtual air-fuel ratio. Otherwise, the volume size and pitch of the after-burn sound may be determined by setting data such as a map or an equation in which the degree that the virtual air-fuel ratio is rich compared to $\lambda=1$ or the virtual air-fuel reduction rate are used as independent variables.

Alternatively, the volume level and pitch of the after-burn sound may be determined as a value inversely proportional to the number of virtual transmission stages or proportional to the variation rate of the virtual transmission intervention torque during transmission. Otherwise, the volume level and pitch of the after-burn sound may be determined by setting data such as a map or an equation in which the number of virtual transmission stages or the variation rate of the virtual transmission intervention torque during transmission are used as independent variables.

Alternatively, it is possible to determine whether the after-burn effect occurs and the volume level and pitch of the after-burn sound may be determined from a value obtained by superimposing or multiplying at least two selected variables among the above-described virtual variables. Here, it is also possible to apply a red zone of the after-burn effect, such as an after-burn sound.

Furthermore, the cycle (time interval) of the after-burn sound may be determined as a value proportional to the virtual engine speed, or otherwise the cycle of the after-burn sound may be determined from a map or an equation using the virtual engine speed as an independent variable.

The after-burn sound is not a steady sound but an impulsive popping sound, and the after-burn effect is impulsive and occurs for a certain duration.

Therefore, the cycle, which is the time interval between the after-burn effect and the impulse signal, needs to be determined and used.

Referring to FIG. 8, an example of the time interval and the intensity (the pulse amplitude, which is an after-burn effect index) of the after-burn effect determined from a virtual variable are shown. When the after-burn effect index indicating the after-burn effect characteristics is determined from the virtual variable, the after-burn effect is produced at the intensity and time interval corresponding to the after-burn effect index.

In FIG. 8, 'A' indicates an example of generating a low-volume of after-burn sound at a long time interval and a low frequency of occurrence when the virtual engine speed is relatively low, whereas 'B' indicates an example of generating a high-volume of after-burn sound at a short time interval and a high frequency of occurrence when the virtual engine speed is relatively high.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The control apparatus may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of producing a virtual after-burn effect using a controller in an electric vehicle, the method comprising:
   receiving, by the controller, vehicle driving information while the electric vehicle is driven;
   determining, by the controller, virtual variable information in an engine according to the received vehicle driving information;
   determining, by the controller, a virtual after-burn effect characteristic according to the determined virtual variable information in the engine;
   outputting, by the controller, a control signal for producing the virtual after-burn effect according to the determined virtual after-born effect characteristic; and
   controlling, by the controller, an operation of an effect-production apparatus configured for producing the virtual after-burn effect according to the control signal output from the controller,
   wherein the virtual after-burn effect characteristic includes a time point at which the virtual after-burn effect is initially produced through the effect-production apparatus.

2. The method according to claim 1, wherein in the determining the virtual variable information, the controller is configured to utilize a virtual engine model, and the virtual engine model is a model preset in the controller to determine a value of the virtual variable information using the vehicle driving information as an input variable to the virtual engine model.

3. The method according to claim 1, wherein the virtual variable information includes at least one of a virtual air-fuel mixture volume, a virtual air-fuel ratio, a virtual exhaust manifold temperature, a virtual engine speed, virtual transmission event information for producing a virtual transmission effect, and a virtual transmission intervention torque as a corrected torque command for correcting a motor torque command to produce the virtual transmission effect.

4. The method according to claim 1, wherein the virtual after-burn effect characteristic is a sound effect reproducing and outputting a sound that simulates an after-burn sound of an engine vehicle through an audio apparatus, and the virtual after-burn effect characteristic further includes at least one of intensity, a duration time, a time interval, and a frequency band or a pitch indicating a sound level of the sound simulating the after-burn sound.

5. The method according to claim 1, wherein the virtual after-burn effect characteristic is a vibration effect generating a vibration that simulates a vehicle vibration due to after-burn in an engine vehicle through a vibrator, and the virtual after-burn effect characteristic further includes at least one of intensity, a frequency, a duration time, and a time interval of a sound simulating the vehicle vibration due to the after-burn.

6. The method according to claim 1, wherein the virtual after-burn effect characteristic is a light-emitting effect representing a light emission state that simulates a backfire due to after-burn in an engine vehicle through a light-emitting apparatus, and the virtual after-burn effect characteristic further includes at least one of intensity, a frequency, a duration time, and a time interval of light emission simulating the backfire due to the after-burn.

7. The method according to claim 1, wherein the vehicle driving information includes at least one of an accelerator position sensor (APS) value indicating a driver's accelerator pedal input value, a gradient of the APS value, an integral value of the APS value, a motor torque command, a gradient of the motor torque command, an integral value of the motor torque command, drive system speed information, and temperature of power electronic components.

8. The method according to claim 1, further including:
   determining, by the controller, a basic torque command according to the vehicle driving information collected from the electric vehicle during vehicle driving;
   determining, by the controller, a corrected torque command for generating and realizing vibrations of a motor configured for producing the virtual after-burn effect according to the vehicle driving information collected from the electric vehicle;
   determining and generating, by the controller, a final motor torque command in which the determined basic torque command is corrected by the determined corrected torque command; and
   controlling, by the controller, operation of the motor configured for driving the electric vehicle according to the generated final motor torque command.

9. The method of claim 1, wherein the controller includes:
   a processor; and
   a non-transitory storage medium on which a program for performing the method of claim 1 is recorded and executed by the processor.

10. An apparatus of producing a virtual after-burn effect in an electric vehicle, the apparatus comprising:
    a driving information detection unit configured to detect vehicle driving information while driving of the electric vehicle;
    a controller configured to determine virtual variable information in an engine according to the vehicle driving information detected by the driving information detection unit, to determine the virtual after-burn effect according to the determined virtual variable information in the engine, and to output a control signal for producing the virtual after-burn effect according to the determined virtual after-burn effect characteristic; and
    an effect-production apparatus mounted on the electric vehicle to be controlled to produce the virtual after-burn effect according to the control signal output from the controller,
    wherein the virtual after-burn effect characteristic includes a time point at which the virtual after-burn effect is initially produced through the effect-production apparatus.

11. The apparatus according to claim 10, wherein the controller is configured to utilize a virtual engine model for determining the virtual variable information, and the virtual engine model is a model preset in the controller to determine a value of the virtual variable information using the vehicle driving information as an input variable to the virtual engine model.

12. The apparatus according to claim 10, wherein the virtual variable information includes at least one of a virtual air-fuel mixture volume, a virtual air-fuel ratio, a virtual exhaust manifold temperature, a virtual engine speed, virtual transmission event information for producing a virtual transmission effect, and a virtual transmission intervention torque as a corrected torque command for correcting a motor torque command to produce the virtual transmission effect.

13. The apparatus according to claim 10, wherein the virtual after-burn effect characteristic is a sound effect reproducing and outputting a sound that simulates an after-burn sound of an engine vehicle through an audio apparatus, and the virtual after-burn effect characteristic further includes at least one of intensity, a duration time, a time interval, and a frequency band or a pitch indicating a sound level of the sound simulating the after-burn sound.

14. The apparatus according to claim 10, wherein the virtual after-burn effect characteristic is a vibration effect generating a vibration that simulates a vehicle vibration due to after-burn in an engine vehicle through a vibrator, and the virtual after-burn effect characteristic further includes at least one of intensity, a frequency, a duration time, and a time interval of a sound simulating the vehicle vibration due to the after-burn.

15. The apparatus according to claim 10, wherein the virtual after-burn effect characteristic is a light-emitting effect representing a light emission state that simulates a backfire due to after-burn in an engine vehicle through a light-emitting apparatus, and the virtual after-burn effect characteristic further includes at least one of intensity, a frequency, a duration time, and a time interval of light emission simulating the backfire due to the after-burn.

16. The apparatus according to claim 10, wherein the vehicle driving information includes at least one of an accelerator position sensor (APS) value indicating a driver's accelerator pedal input value, a gradient of the APS value, an integral value of the APS value, a motor torque command, a gradient of the motor torque command, an integral value of the motor torque command, drive system speed information, and temperature of power electronic components.

17. The apparatus according to claim 10, wherein the controller includes:
   a basic torque command generation unit determining a basic torque command according to the vehicle driving information collected from the electric vehicle during vehicle driving;
   a virtual after-burn production control unit generating a corrected torque command for generating and realizing vibrations of a motor configured for producing the virtual after-burn effect according to the determined virtual after-burn effect characteristic; and
   a final torque command generation unit generating a final motor torque command in which the determined basic torque command is corrected by the determined corrected torque command,
   wherein operation of the motor configured for driving the electric vehicle is controlled according to the final motor torque command generated and output from the final torque command generation unit.

* * * * *